(12) United States Patent
Winkelman et al.

(10) Patent No.: US 10,032,212 B2
(45) Date of Patent: Jul. 24, 2018

(54) SYSTEM AND METHOD FOR LOCATION BASED SECURE ORDERING AND PAYMENT

(71) Applicants: VOLKSWAGEN AG, Wolfsburg (DE); AUDI AG, Ingolstadt (DE)

(72) Inventors: Dominic Winkelman, San Mateo, CA (US); Stefan Sellschopp, Dachau (DE)

(73) Assignees: AUDI AG, Ingolstadt (DE); VOLKSWAGEN AG, Wolfsburg (DE)

(*) Notice: Subject to any disclaimer, the term of this patent is extended or adjusted under 35 U.S.C. 154(b) by 1185 days.

(21) Appl. No.: 14/070,930

(22) Filed: Nov. 4, 2013

(65) Prior Publication Data
US 2015/0127493 A1 May 7, 2015

(51) Int. Cl.
*G06Q 30/06* (2012.01)
*G06Q 20/12* (2012.01)
*G06Q 20/32* (2012.01)
*G06Q 20/40* (2012.01)

(52) U.S. Cl.
CPC ......... *G06Q 30/0635* (2013.01); *G06Q 20/12* (2013.01); *G06Q 20/3224* (2013.01); *G06Q 20/4012* (2013.01)

(58) Field of Classification Search
USPC .......................................................... 705/26
See application file for complete search history.

(56) References Cited

U.S. PATENT DOCUMENTS

| | | | |
|---|---|---|---|
| 2007/0087756 A1* | 4/2007 | Hoffberg | G06Q 10/0631 455/450 |
| 2008/0172340 A1* | 7/2008 | Karlsson | G06Q 20/401 705/75 |
| 2012/0221463 A1 | 8/2012 | Nuzzi | |
| 2013/0085928 A1* | 4/2013 | McKinney | G06Q 20/20 705/39 |

FOREIGN PATENT DOCUMENTS

| | | |
|---|---|---|
| EP | 1944736 A1 | 7/2008 |
| WO | 2004105359 A2 | 12/2004 |
| WO | 2011065974 A1 | 6/2011 |

OTHER PUBLICATIONS

CNN Money; 5 pay-by-phone apps tested; downloaded from http://money.cnn.com/gallery/technology/2012/09/24/mobile-payment . . . ; downloaded Sep. 12, 2013

\* cited by examiner

*Primary Examiner* — Garcia Ade
(74) *Attorney, Agent, or Firm* — Barnes & Thornburg LLP

(57) ABSTRACT

An in-vehicle personalized location-based secure ordering and payment system, comprising means to match a GPS location of a vehicle to a location of a merchant, means to automatically launch an application on a computing device of the vehicle that allows a vehicle occupant to order at least one item for sale by the merchant and send the order to a server, means to authorize the server to make a secure payment to the merchant for the order, and means to send identifying information of the recipient of the ordered items to the merchant for use in fulfilling the order.

8 Claims, 8 Drawing Sheets

SYSTEM AND METHOD FOR LOCATION BASED SECURE ORDERING AND PAYMENT

BACKGROUND

The present disclosure relates to a system, components and methodologies for location based secure ordering and payment. In particular, the present disclosure is directed to a system, components and methodologies that enable in-vehicle ordering from, and secure payment to, a merchant in the immediate vicinity of the vehicle.

There are many instances in which commercial transactions are conducted from an automobile or other vehicle. Often, such transactions include driving up to a walkie-talkie quality ordering point, where the driver conveys an order to a cashier of a merchant by speaking into a microphone, and the cashier records the order and reads it back to the driver to confirm it is correct. The driver then proceeds to a cashier window to make payment by cash or credit card, and to pick up the ordered goods or receive the ordered services. For example, drive-through merchants such as fast food restaurants, coffee vendors, car washes, and the like, often provide for such drive through service.

However, placing an order may be difficult and prone to error if the ordering system audio is of low quality, or if there is significant ambient noise. Further, making payment often involves searching pockets or a purse for cash. Handing payment to a cashier and receiving change may be inconvenient if the weather is inclement or a stiff breeze is blowing.

Moreover, receiving change can be a clumsy process, and the change is subject to being dropped and lost. If payment is made with a credit or debit card, the security of the information on the card may be compromised by an unscrupulous cashier or merchant.

SUMMARY

According to the present disclosure, a system is provided for in-vehicle ordering from, and secure payment to, a merchant in the immediate vicinity of the vehicle.

Disclosed embodiments provide a solution to the above-described technical problems by providing an in-vehicle mechanism for identifying a merchant in proximity to the vehicle, presenting a menu of items/services available for purchase from the merchant, obtaining a user's selections of items/services to purchase as an order, sending the order to a server with authorization for payment using payment account information already residing on the server, forwarding the order to the merchant and securely making payment to the merchant, and sending confirmation of the merchant's acceptance of the order and payment to the vehicle for display. The order may then be fulfilled by the merchant. To facilitate delivery of the order, the system may identify the vehicle and/or an occupant of the vehicle to the merchant as the recipient of the ordered items/services.

In illustrative embodiments, an in-vehicle ordering and payment system comprises a processor, a graphical display device, and a transceiver to communicate with a system server, a GPS module, and a vehicle identifier such as a license plate.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

Figure 1:
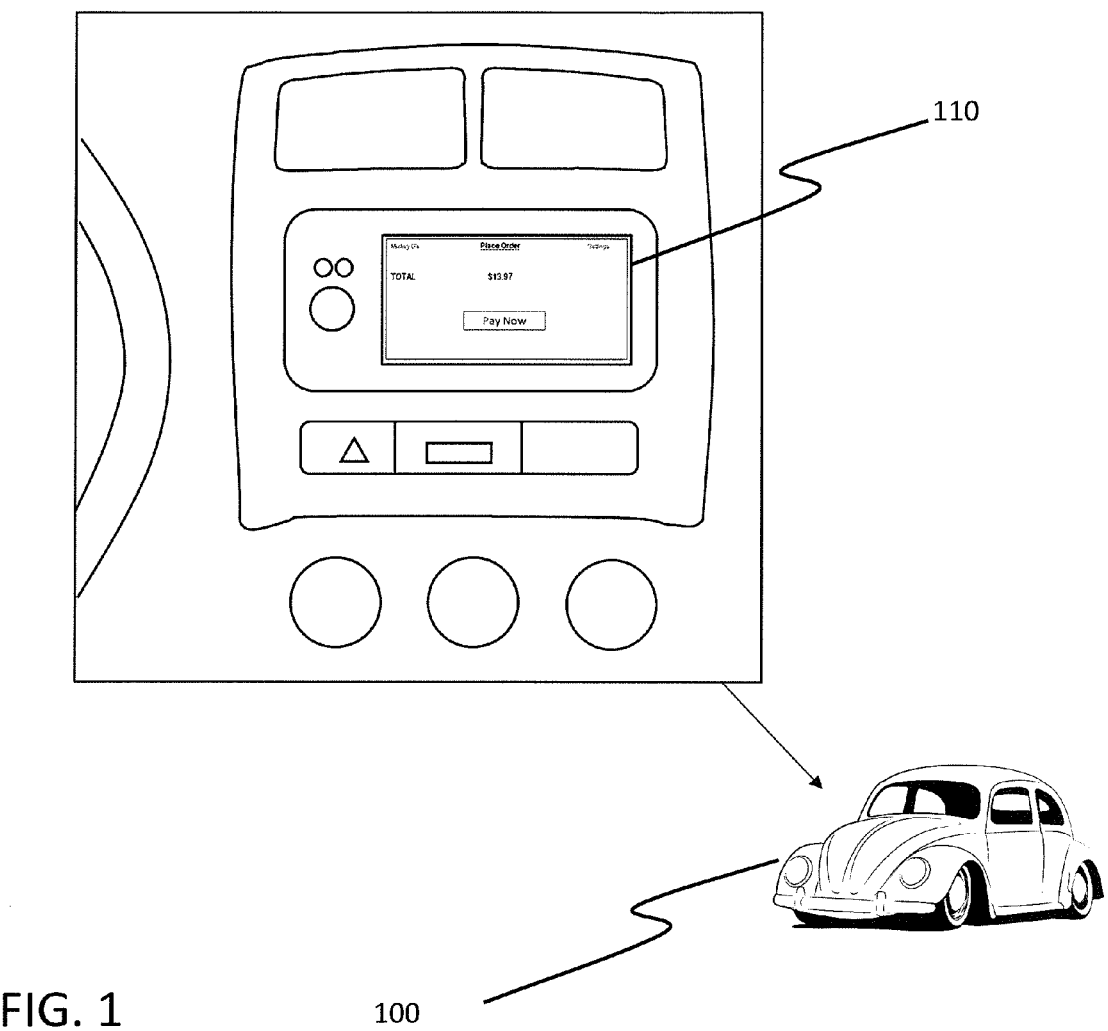
FIG. 1 is an illustration that includes an exemplary vehicle display presenting an order confirmation screen in accordance with the disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

There are many instances in which commercial transactions are conducted from an automobile or other vehicle. Often, such transactions involve a vehicle driver driving up to a walkie-talkie quality ordering point, where the driver conveys an order to a merchant cashier by speaking into a microphone and the cashier records the order and reads it back to the driver to confirm it is correct. The driver then proceeds to a cashier window to make payment by cash or credit card, and to pick up the ordered goods or receive the ordered services. For example, drive-through merchants such as fast food restaurants, coffee vendors, car washes, and the like, often provide for such drive through service.

Moreover, many merchants offer remote ordering for later pickup, such as restaurants that take "to-go" orders by telephone for later pickup. Typically, pickup of an order is accomplished by driving to the restaurant to obtain the ordered goods. The driver parks the car, enters the restaurant, and makes payment with cash or a credit card to receive the goods. Thus in such a scenario, the vehicle is in very close proximity to the merchant's location.

Conventionally, mobile devices such as smart phones and tablet computers can similarly be used to place orders and make payment. For example, one prominent coffee vendor provides a mobile application (app) running on such devices for remotely ordering coffee for local pickup, and making payment via the app. The app generates and outputs a scannable graphic such as a bar code or QR code on the mobile device screen, which may be scanned by a cashier at the merchant site to confirm payment when the ordered coffee is picked up.

Many other conventional mobile ordering solutions also exist that are implemented using an app running on a mobile device, such as "Google® Wallet", "Pay with Square®", PayPal®, LevelUP, and Venmo.

However, as noted previously, placing an order from a vehicle may be difficult and error prone, depending on the environment and the system being used. Moreover, the merchant's technical challenges when accepting an order from a consumer in a vehicle in proximity to the merchant are numerous including how best to provide an effective mechanism for presenting a menu of items or services offered for sale by the merchant, enabling selection of those items or services for purchase as an order, and receiving the submitted order with secure and convenient payment to the merchant.

Disclosed embodiments provide a solution to the above-described technical problems by providing an in-vehicle mechanism for identifying a merchant in proximity to the vehicle, presenting a menu of items/services available for purchase from the merchant, obtaining a user's selections of items/services to purchase as an order, sending the order to a server with authorization for payment using payment account information already residing on the server, forwarding the order to the merchant and securely making payment to the merchant, and sending confirmation of the merchant's acceptance of the order and payment to the vehicle for display. The order may then be fulfilled by the merchant. To facilitate delivery of the order, the system may identify the vehicle and/or an occupant of the vehicle to the merchant as the recipient of the ordered items/services.

Thus, as illustrated in FIG. 1, a vehicle 100 may include in-vehicle system components 110 designed in accordance with the disclosed embodiments. In response to the in-vehicle system components 110 receiving order information, a menu, order form or other informational data may be displayed on a display/input interface included in the in-vehicle system components 110.

Figure 2A:
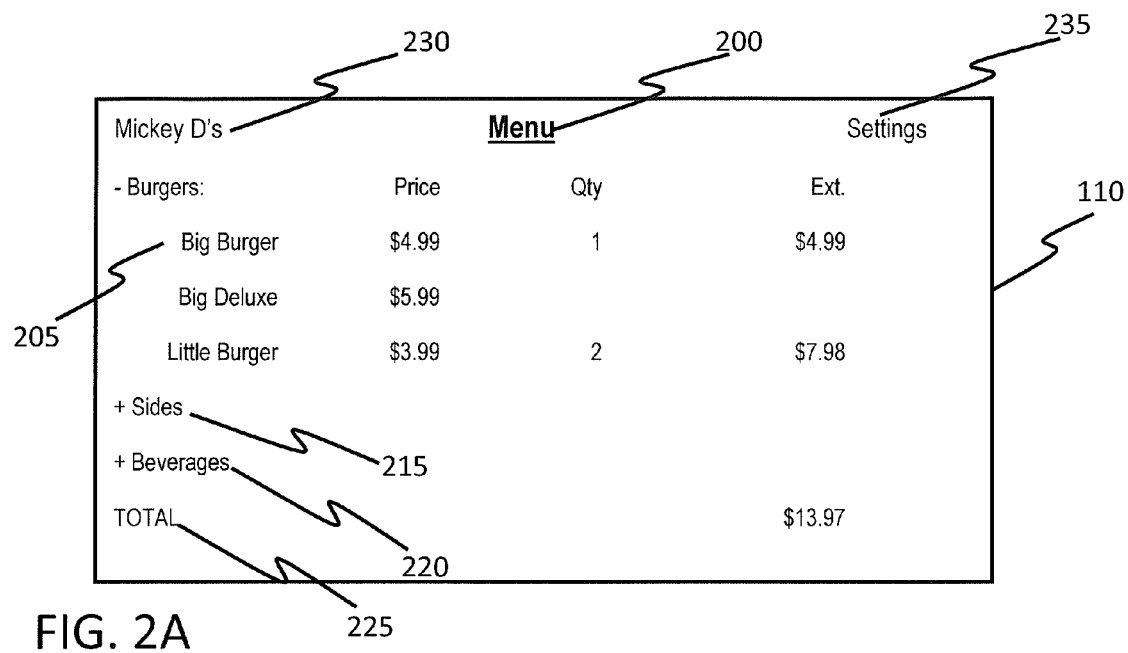
FIGS. 2A is an exemplary presentation of a screen for ordering, and 2B is an order confirmation screen such as that presented on the display of FIG. 1, in accordance with the disclosure.

Thus, as shown in FIG. 2A, a menu 200 may be output to the user for review on the in-vehicle system components 110. That menu may include a listing of available food items 205 for selection along with the ability to enter the quantity or number of those food items that the user would like to order. Each food item entry 205 may also include the cost associated with those purchases.

Additionally, the output view may include an icon 215 for viewing additional details regarding other types of products 215, 220 to purchase, e.g., the difference between an entree and a side or beverage. The ability to access those additional details may be controlled by the system receiving an instruction to do so from the user. This and any other inputs to the in-vehicle system components 110 may be provided in various alternative data/instruction input protocols.

Thus, the display/input interface may be implemented as a touch screen that accepts selection and entry of instructions via receiving and analyzing a user's touching of icons displayed on the screen. Alternatively or in addition, other mechanisms for receiving data entry may be utilized, including a user's manipulation of other knobs and buttons in the vehicle, wherein the in-vehicle system components 110 are configured to interpret the manipulation to control the in-vehicle system components in a secure product/service ordering mode of operation. Likewise, data, commands or instructions may be received via voice recognition, gesture recognition or any other conventionally known manner of data entry in a vehicle or otherwise.

Returning to FIG. 2A, during receipt of the order details from the user, a running total 225 may displayed on the view, thereby enabling the user to be aware of the total price of the order.

Likewise, the view provided by the in-vehicle system components 110 may include a merchant indication 230, which may indicate the merchant that is offering the goods/services listed in the menu view illustrated FIG. 2A. Likewise, it should be appreciated that the merchant indication 230 may also include some indicia of a specific location for that listed merchant, for example, the address of the merchant location, the cross roads of the merchant location, a neighborhood name for the merchant, or a nickname of the merchant (e.g., Dad's favorite pizza place) input and stored into the in-vehicle system components 110 by a user.

Furthermore, an excitable settings icon 235, which when excite may trigger display another view that enables a user to input various setting associated with the operation of the system 110.

Figure 2B:
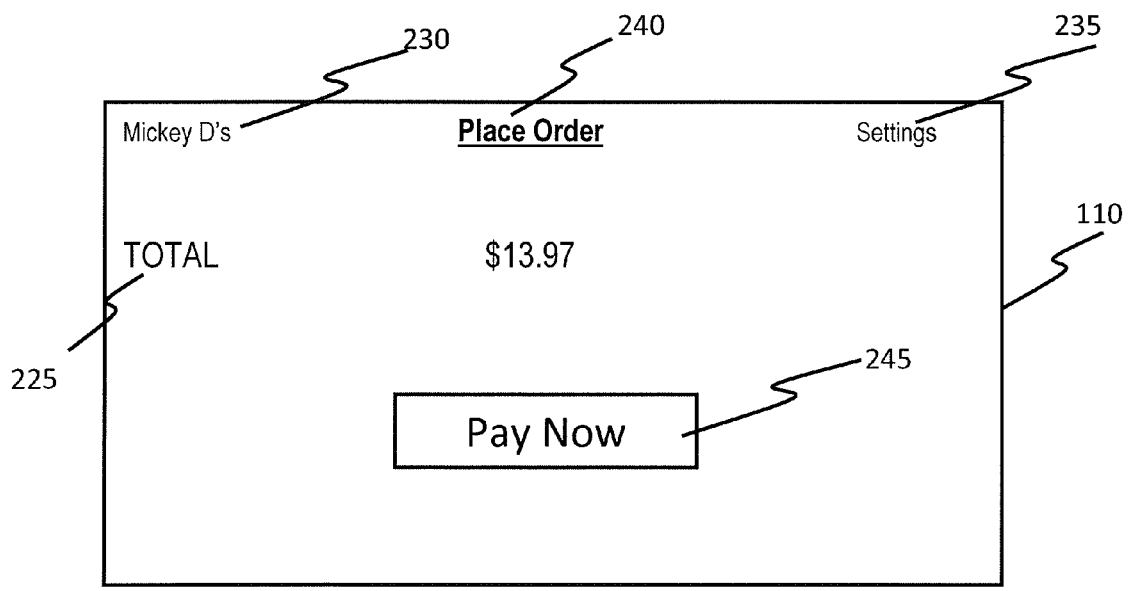

FIG. 2B similarly illustrates a view associated with placing an order and display of this view may be triggered following receipt of order details while the view of FIG. 2A. Thus, as shown in FIG. 2B, the merchant indication 230 may still be displayed. Likewise, the total 225 may also be displayed along with an excitable "Pay Now" or "Order Now" icon 245, which when executed triggers method operations for placing the order with the identified merchant along with authorizing a secure payment for that order.

Figure 3:
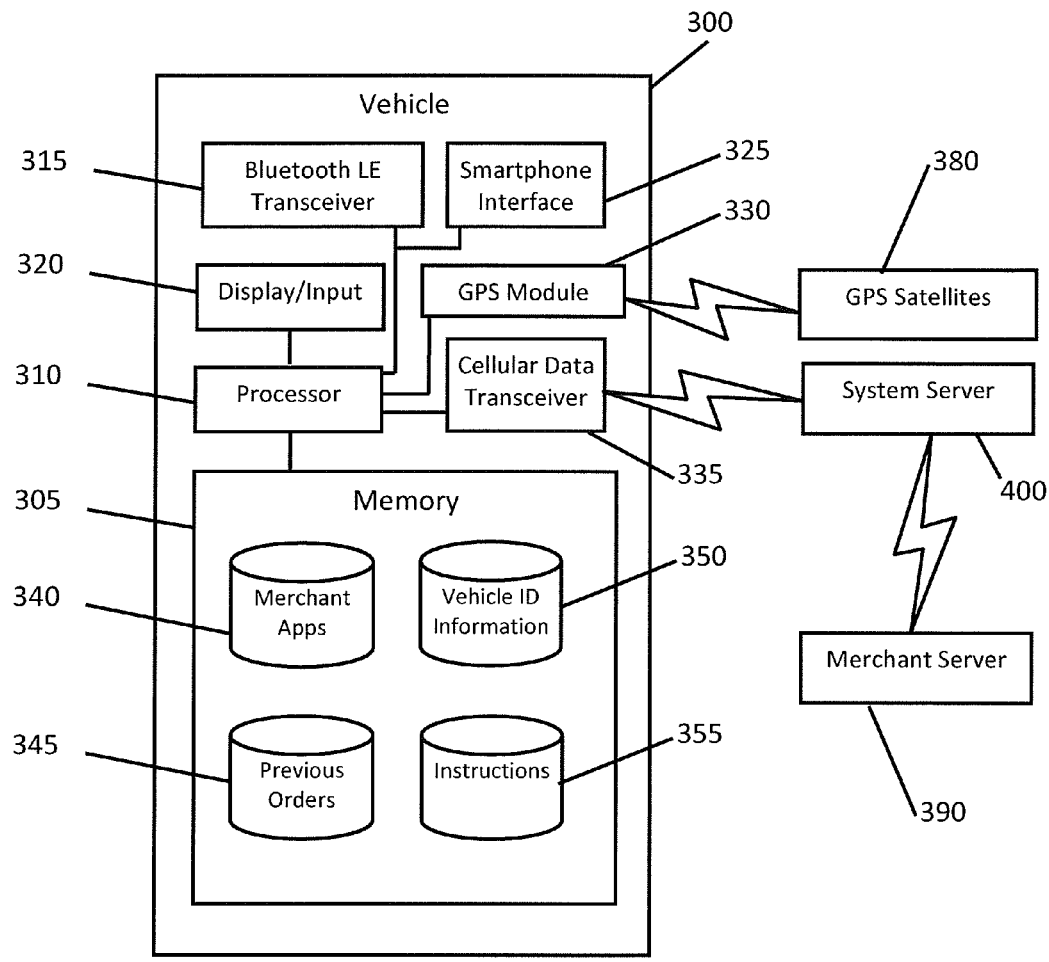
FIG. 3 is a block diagram of an exemplary system in accordance with the disclosure focusing on components of the system that reside in the vehicle.

As mentioned above, the in-vehicle system components are included within a vehicle and may be implemented along with, or as part of, an infotainment system provided in the vehicle. Thus, as illustrated in FIG. 3, the vehicle 300 may include various components that enable access to information and communication with one or more servers via a variety of transceivers. Accordingly, the vehicle 300 may include a Bluetooth LE Transceiver 315, a Cellular Data transceiver 335, or the like, a display and/or input/output interface 320 that may function and display data and receive instructions as explained in connection with FIGS. 2A-2B. Operation of the various components included in the vehicle 300 illustrated in FIG. 3 may be dictated or performed under the direction of one or more processors 310,which may be coupled directly or indirectly to each of the various components illustrated in vehicle 300.

Thus, the processor 310 may be coupled to memory 305 that may incorporate various programs, instructions and data. For example, as explained in more detail below, one or more merchant apps may 340 may be stored and utilized by the processor 310 utilizing various operation instructions 355 for implementing the system. The memory may also store data indicating previous orders 345 made through the system for easy access and to facilitate order resubmission, e.g., if a user has a "usual" order they like from a particular merchant. Additionally, vehicle ID information 350 (e.g., model, make, year, color, VIN, etc.) may be stored and accessible by the processor 310 and merchant apps 340 to enable a merchant to identify the user and deliver a submitted order of goods and services to the vehicle 300.

Thus, in an embodiment, the system may obtain information of the vehicle from a server of a supplier of a vehicle, such as a vehicle manufacturer or a dealership, for example. Such information may include the vehicle make, model, and color, for example, as well as a VIN(Vehicle Identification Number). In addition, driver information may be obtained from the vehicle dealership after the vehicle is purchased, for example, from a server containing information entered by the dealership, such as for warranty purposes. Alternatively or in addition, the system may obtain information of the vehicle from the driver, including license plate information such as state and alphanumeric vehicle identifier, an RFID tag ID, or an NFC based order ID. In an embodiment, the driver may access the system server using a web browser on a PC (Personal Computer) to enter the registration information.

Thus, it should be understood that identification information identifying the vehicle and/or the driver may be transmitted to a vendor/merchant with an order and payment data. Thus, information such as a physical description of the vehicle including the vehicle's make, model, color, and license plate information may be sent with the payment. Thus, at delivery, the merchant may verify the identity of the vehicle simply by looking at and verifying the vehicle's make, model, color, and license plate information.

In an embodiment, a Bluetooth® identifier of the vehicle head unit may be sent with the orders submission and payment data. In an embodiment, the merchant can automatically identify the vehicle using a camera-based license plate reader, and/or using Bluetooth LE proximity detection based on the head unit Bluetooth identifier.

Further, the vehicle system components 300 may include a smartphone interface 325 that enables the vehicle components to interact with a user's mobile device, e.g., smartphone, tablet, mobile phone, etc. Accordingly, in at least one embodiment, the system may generate a bar code or other code that may be visually or wirelessly scanned on a user's mobile device. Thus, via the interface 325, a user's mobile device may receive a security indication, e.g., bar code, wireless code, etc. that may be stored on the mobile device and used to redeem or claim the product/order/service at the merchant.

The vehicle components 300 may also a Global Positioning Service (GPS) module 330, which enables the ability to determine the geographic location of the vehicle 300. This may be used by the processor 310 and instructions 355 to enable the ability to identify locations of product/good/services merchants in proximity to the vehicle 300, e.g., locating the closest dry cleaner, grocery store, coffee shop with a drive through, etc.

Thus, in one example, a user may utilize the vehicle system components 300 to locate a movie theater in relatively close proximity to the user's vehicle, identify movie times and purchase a number of tickets to the move via the system 300. By utilizing the smartphone interface, or any other manner of receiving the redemption indicia from the merchant, the user may then gain entry to the movie via his smart phone, e.g., bar code, wireless code scanning, etc.

Similarly utility may be provided when a family is going out to dinner but has no reservations at a particular restaurant. The system 300 may be used to obtain directions to a specific restaurant, contact the restaurant to obtain reservations or put the family's name on a list for a table, and obtain some indicia of the identity of the family enabling them to be contacted at the restaurant when their table is ready. Such an implementation enables a merchant, here a sit down restaurant, to obtain additional information about a patron's family, analyze that information to provide improved service and increased likelihood of consumer loyalty and automate the ability to contact the family when their table is ready. This functionality example also potentially reduces or eliminates the need to issue a paging device to a patron while they are waiting for their table.

Thus, the system components improve functionality and features available to merchants. Moreover, the system components increase options and ease of use for users/consumers by enabling the in-vehicle system components to effectively act as a concierge of sorts for a user driving his vehicle locally or far from home.

To support this type of in-vehicle system functionality, the in-vehicle components 300 communicate with various off-vehicle components associated with the system and merchants. Thus, the cellular data transceiver 335 or the like may be utilized to communicate with one or more system servers 400, which in turn communicate with one or more merchant servers 390. Communication between the system server(s) 400 and the merchant server(s) may be performed via wired or wireless connections, e.g., via the Internet and/or any other public and/or private communication network. Additionally, the GPS module 330 may communicate with various GPS satellites 380 to provide information and data indicating the relative position of the vehicle.

Figure 4:
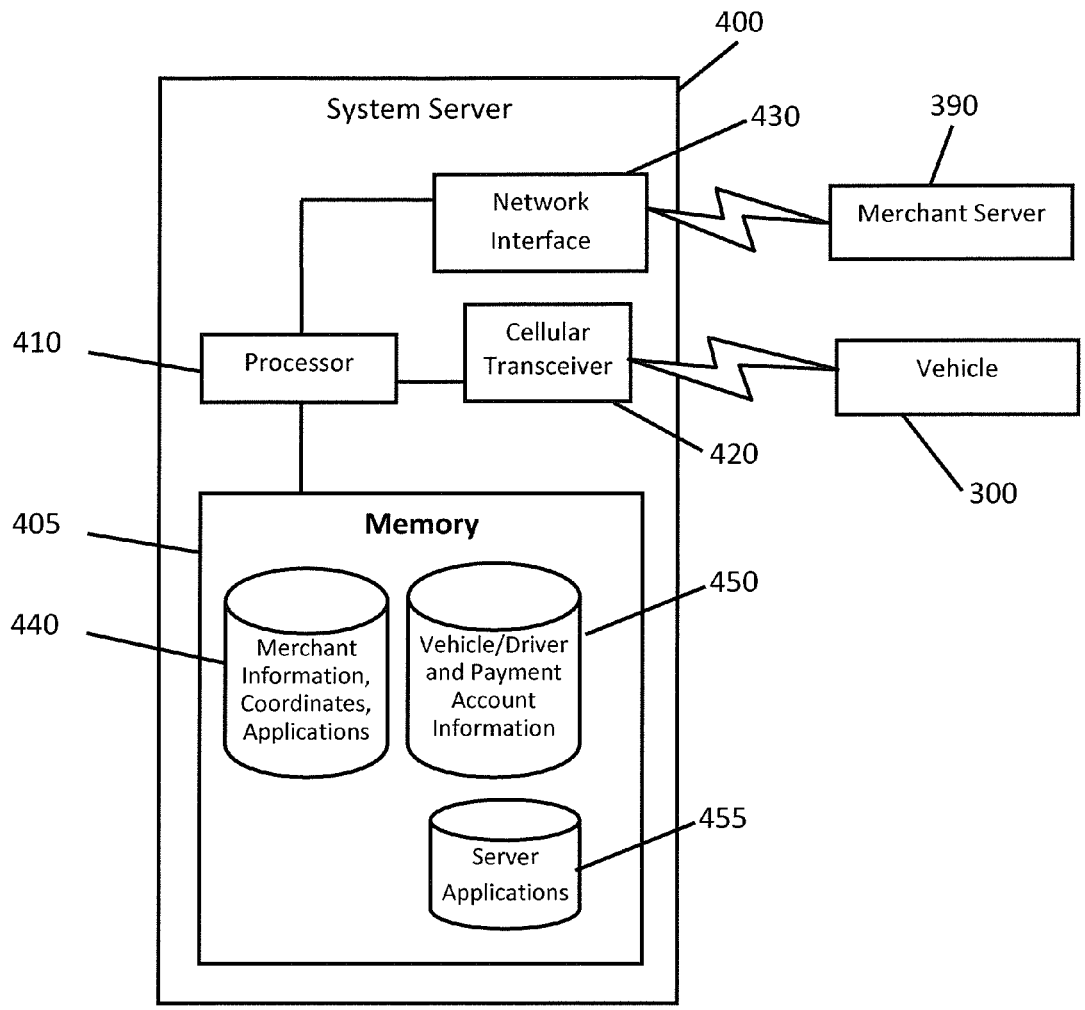
FIG. 4 is a block diagram of an exemplary system such as the system shown in FIG. 3, now focusing on components of the system that reside in the server, in accordance with the disclosure.

FIG. 4 illustrates one example of the constituent structure of a system server(s) 400. As shown in FIG. 4, the system server 400 may include one or more processors 410 coupled to and accessing and storing data and instructions in the memory 405. In order to provide the ability to communicate with the merchant server(s), the system server 400 may include or be coupled to a network interface 430. Likewise, in order to communicate with in-vehicle components 300, the system server 400 may include or be coupled to a cellular transceiver 420. The memory 405 may include various instructions and data accessible by the processor(s) 410 to provide the functionality disclosed herein. Thus, the memory 405 may include merchant information, coordinates, and applications to enable location based, secure ordering and payment. Likewise, the memory 405 may store vehicle/user/driver and payment account information 450 that may be accesses to facilitate the location based, secure ordering and payment. Further, that information and data 450 may include a user profile that may include, for example, prior orders made at various merchants that may be accessed to facilitate repeat orders of the same or similar products/goods/services, e.g., something that is a complicated order and difficult to remember, for example, a large whole wheat margarita pizza with free range chicken and black olives on half of the pizza. The memory 405 may also include various server applications for supporting the functionality described herein, along with maintaining security, identifying fraudulent activity, analyzing consumer trends, etc.

Figure 5:
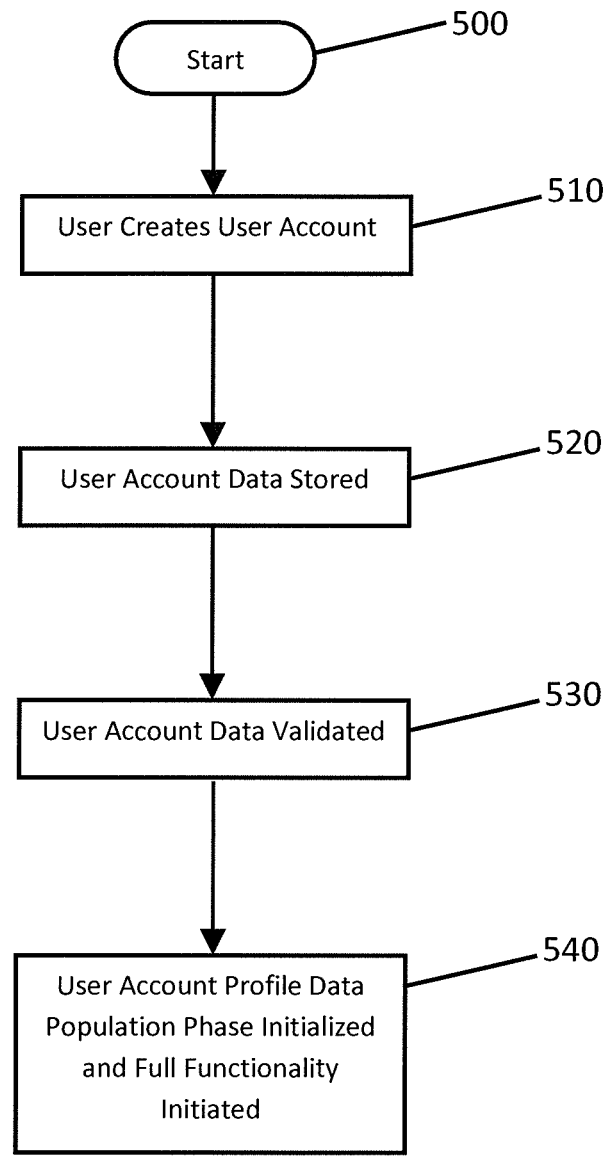
FIG. 5 is a flow diagram of an exemplary method of registering a user with the system.

Before availing themselves of the above-described functionality of the location based secure ordering and payment system, a user/driver must register with the system. As illustrated in FIG. 5, this begins at 500 and control proceeds to 510 at which data input by the user is received from the user. It should be understood that this data may be entered via the in-vehicle system components and/or a web-site coupled to the system server (e.g., illustrated in FIG. 4), etc. Subsequently, control proceeds to 520 at which the input data is stored in the memory of the system server and/or the in-vehicle system components. It should be understood that the stored should be maintained in a consistent manner and this maintenance may be performed on a batch or real-time manner using various conventionally known techniques.

Control then proceeds to 530, at which the user account data is validated. This may involve cross checking input data to ensure accuracy and/or confirming payment details, e.g., bank account(s), name on credit card, billing address, etc.

Subsequently, control proceeds to 540, at which the user account profile data population phase is initialized and full functionality of the system features is initiated. As a result, the user/driver may utilize the functions of the location based secure ordering and payments system to order/purchase products/goods/services from one or more merchants using the user's in-vehicle system components. As a result, the system server, and optionally merchants and third parties, may analyze the data to identify ways to improve functionality and features for users, provide customized product offerings to the user, etc.

Figure 6A:
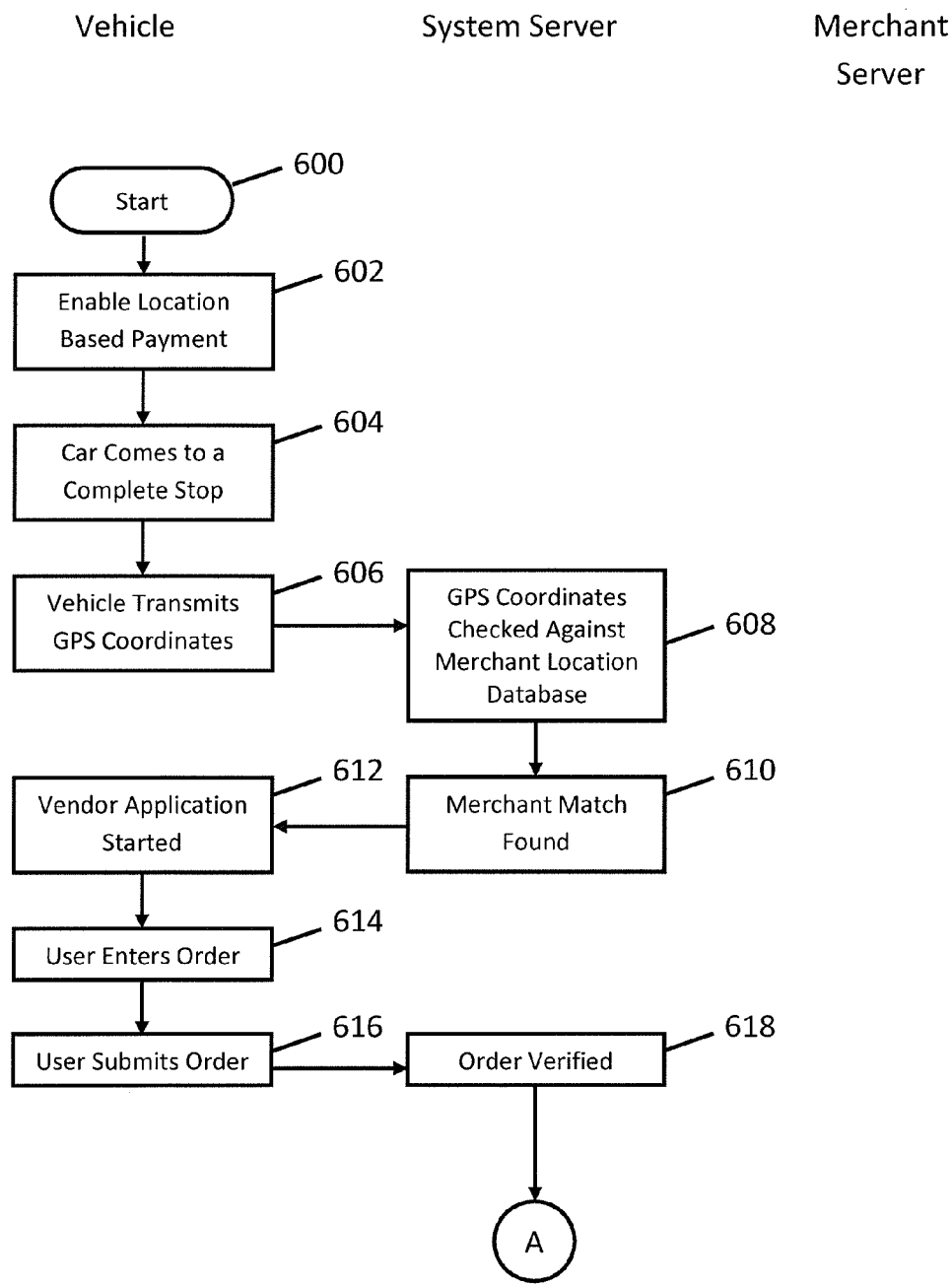
FIGS. 6A, 6B, and 6C constitute a flow diagram of an exemplary method of placing an order with a merchant and securely paying the merchant for the order, in accordance with the disclosure.

Following this initialization of full functionality, the system server is able to support the location based, secure ordering and payment on behalf of the user/driver. This functionality may be implemented in a number of different ways including the method operations illustrated in FIG. 6A. As shown in that figure, various operations are performed and at the vehicle level thereby triggering operations of the system server(s). Thus, operations may begin at 600 and proceed to 602, at which location based payment is enabled. Control then proceeds to 604, at which it is determined that the vehicle has come to a complete stop; following this determination, a location based secure ordering and payment operation mode may be activated to enable the user/driver to input data to the in vehicle system. It should be understood that this operation may be provided to ensure that a user is not distracted while driving his vehicle; accordingly, depending on safety constraints, it may be optionally omitted to enable a user/driver to input data using voice recognition technology, gesture technology. Alternatively, the in vehicle system components may be configured to enable someone other than the user/driver to input ordering data and instructions, e.g., a passenger or passengers in a front passenger seat or in other seats in the vehicle. In this regard, it is possible that the smartphone interface 325 may be implemented in a manner that enables a passenger to input menu selections via a mobile device, e.g., phone or tablet, and utilize the in-vehicle system components to process and submit the selections as an order.

Returning to FIG. 6A, when control proceeds to 606, the in-vehicle components transmit the GPS coordinates of the vehicle to a system server that is remote from the vehicle. Next, at 608, the GPS coordinates are checked against merchant location data stored in a merchant location database or the like by the system server(s) that has received the vehicle transmitted GPS coordinates.

If a match is found at 610, an indication of that match is sent to the in-vehicle components and then control proceeds to 612 at which a vendor application for the matched merchant is begun at the vehicle. Thus, the in-vehicle system components may launch an app on the vehicle head unit to contact a system server(s) to begin processing an order. Thus, in an embodiment, the system may use vehicle GPS to recognize when the vehicle has stopped in the immediate vicinity of a merchant that is registered with the system. Accordingly, the system may launch an app specific to that merchant on the head unit of the vehicle, which presents a menu of items that may be ordered. In an embodiment, the app may be automatically downloaded from the system server to the head unit and launched. Thereafter, the app may be stored in a memory of the head unit or locally accessible to the head unit.

In an embodiment, the system can check for updates to the app and push updates to the head unit. In an embodiment, the system server may support or be compatible with a programming template so that a vendor/merchant may easily generate a merchant app that may be used with the system.

Returning to FIG. 6A, the user/driver is able to enter order data at 614 and submit that order at 616. The driver places an order by using the app to select items for purchase, for example, by placing them in an electronic shopping cart or the like, similar to ordinary online shopping. Payment may then be completed by credit card, debit card or some other payment service. The payment information may be stored on a system server that is in data communication with a head unit included in the in-vehicle components 300, for example using a cellular-based data communication service e.g., cellular data transceiver 335 illustrated in FIG. 3.

This triggers transmission of that order data to the system server(s) and, at 618, the order is verified.

Figure 6B:
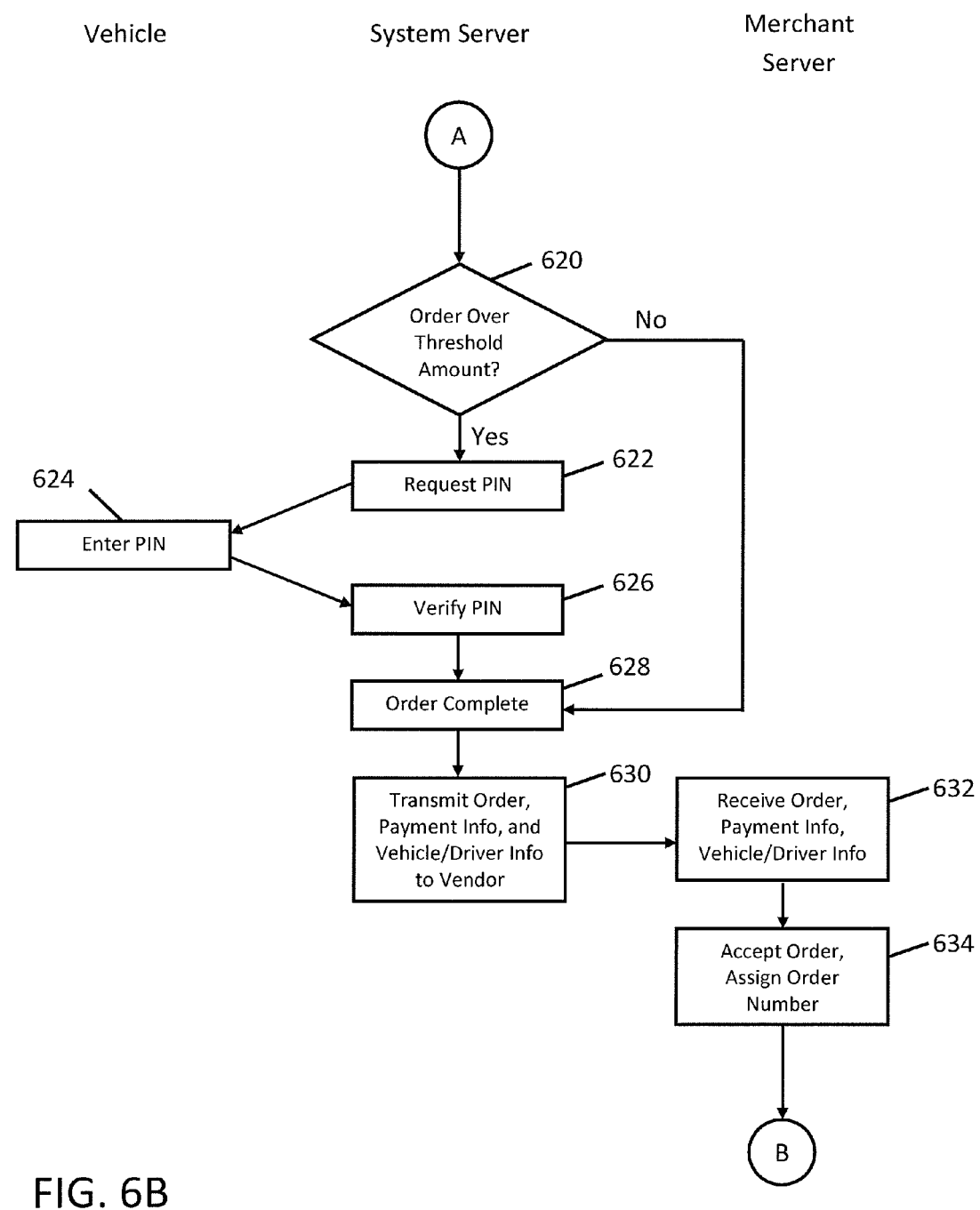

Thus, control proceeds to 620 as illustrated in FIG. 6B. At 620, the system server determines whether the order is over a threshold amount that would require additional security or validation data. If it is not over the limit, control proceeds to 628 (discussed below). If it is above the limit, the system server triggers a request for entry of a PIN (Personal Identification Number) code or similar security data, security question, biometric data, etc. Thus, the user may enter that PIN or security data at 624, which is then transmitted to the system server(s) for verification. Alternatively, a PIN may be required to be input with every order. If the PIN is verified, the order is completed at 628 and transmitted along with payment information and vehicle/driver information to the vendor/merchant's server at 630. Accordingly, the system server may then contact the merchant server to convey the order and make payment.

Subsequently, the merchant server(s) receives the order, payment information and vehicle/driver information at 632 and accepts the order and assigns an order number at 634.

Figure 6C:
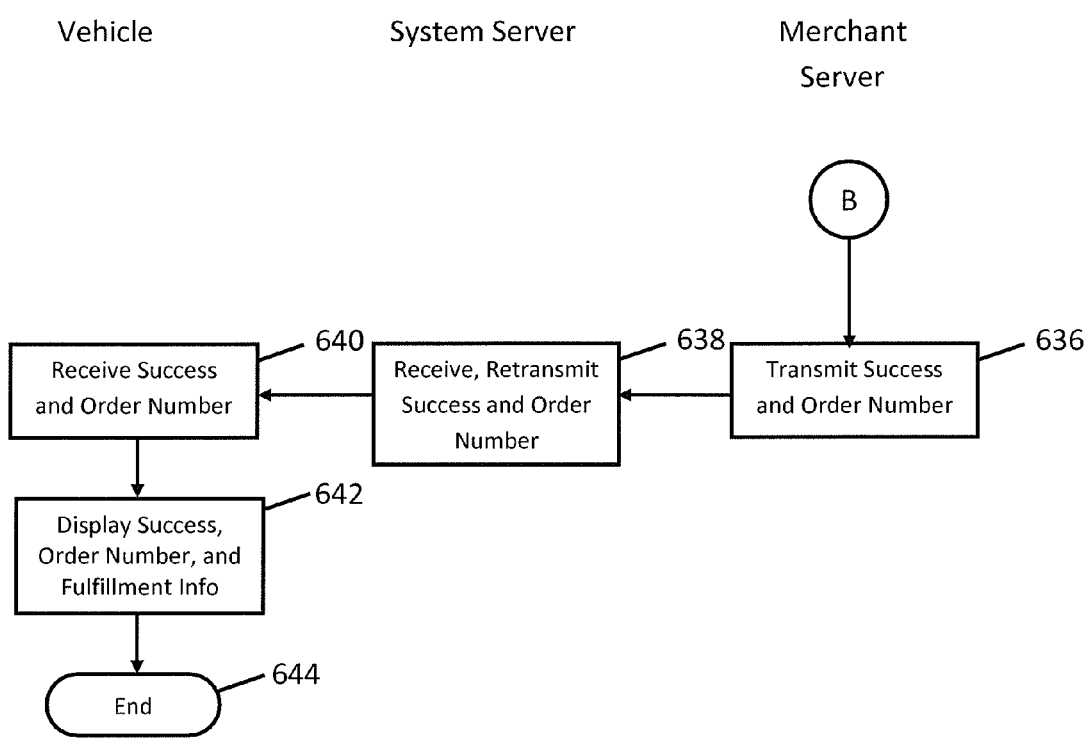

Control then proceeds to 636 illustrated in FIG. 6C at which an indication that the order has been successfully submitted to the merchant/vendor and the order number are transmitted to the system server(s) and subsequently retransmitted to the in-vehicle system components at 638. Following receipt of that data at the in-vehicle system components at 640, an indication of the order success is displayed along with the generated order number and fulfillment information (e.g., directions for obtaining the ordered product/goods/services). To fulfill the order using driver-specific information, information such as the driver name, photo, identification data and/or mobile phone number may be sent with payment. At delivery, the merchant may then verify the driver or vehicle information to confirm the driver's identity.

Control then proceeds to 644, and the operations end.

Although not discussed above, in an embodiment, the ordered products/goods/services may be shipped or delivered to an address. Similarly, the system may be used to schedule and pay for vehicle specific services, e.g., an oil change, detailing, vehicle service, on a particular day or at a particular time at a location specified by the merchant (a merchant location) or specified by the user (e.g., ordering windshield repair at the user's house).

In an embodiment, digital items (e.g., songs, video, text, newspapers, magazines, books) may be sent via email, provided a recipient email address is included with the order information conveyed to the merchant.

In an embodiment, loyalty programs may be used to encourage repeat business. Thus, the system may be implemented to enable the merchant/vendor to know how many times a user has visited over a period of time and provide special offers, incentives, reminders. Moreover, the merchant/vendor and/or system may be configured to keep an order history so that a merchant/vendor app can provide the option for the user to order "their usual," the same order as the last time they ordered, the same order ordered on a particular day of the week or date, etc.

In an embodiment, a so-called "check-in" program may be implemented that enables a user to "call ahead" and check in for a seating wait list at a particular restaurant. Thus, if a family were going out to dinner at a particular restaurant, the system and in-vehicle system components could be utilized to obtain a reservation at the restaurant or get their name on a seating wait list to enable a reduced wait time.

By using the in-vehicle system components, there would be no need to issue the user a pager (which is common at some large restaurants to notify a user that their table is ready). Instead, the in-vehicle system components could be used to notify the user, e.g., a family with small children sleeping in the car can stay in the car until the table is ready. Alternatively, or in addition, the system and in-vehicle system components could be set up to shift notification to a user's mobile phone, once the ignition is turned off on the vehicle.

In accordance with an embodiment, the in-vehicle components may be linked with one or more personal computing devices, e.g., mobile phones or tablets, so as to enable ordering via a user interface of such a computing device by someone other than the driver, e.g., a passenger in the front passenger seat or the back seat. Such an embodiment could allow a user to enter order data while the vehicle is moving without potentially reducing the safety for the vehicle.

Similarly, in an embodiment, the system may be used to initiate, facilitate, or complete hotel check-in while the user is still en route to the hotel, thereby saving time for the user.

In accordance with an embodiment, the system could facilitate, track or utilize points issued to a user by the merchant for visiting a location.

In an embodiment, gift cards or merchant credit may be used when purchasing goods/services/products via the system by the user entering gift card or merchant credit data into the system server via the in-vehicle system components or via a web-site accessible via a mobile phone or a computer coupled to the Internet and linking that information with a merchant or association of merchants. In an embodiment, discounts, coupons, and the like may be offered for using the system, and/or for ordering from particular identified merchants using the system.

The disclosed embodiments differ from the prior art in that they provide a system and methodologies that simplify placing orders and paying at a business (e.g., drive-thru, gas station, car wash) by allowing the driver of a vehicle to place his order, verify the order, and then authorize payment all from the head end unit of an infotainment system of the vehicle. This is a significant technical improvement to the prior art, wherein commercial transactions are carried out with a mobile electronic device (e.g., U.S. Pat. Pub. No: U.S. 2008/0172340) or a payment device with a unique identifier for specific financial payment account info is integrated into a vehicle (e.g., U.S. Pat. Pub. No: U.S. 2013/0085928). Conventional technology enables secure mobile payment processing (e.g., U.S. Pat. Pub. No: U.S. 20120221463, EP 194473, EP 2504801)

However, it fails to automate the process by using a vehicle's GPS coordinates to determine the location of the vehicle, and then match that location with a valid business/vendor/merchant that has registered to accept these location based payments. Once this match has occurred, a customized application may be triggered to open so that the driver of the vehicle may complete their order. Thus, when the driver/user is ready to submit the order, the system server uses the driver/user's account that is tied to the vehicle to contact the business's server to submit the order and pay for the order. The system server may also transmit information including the make, model, color, and license plate of the vehicle so that the order may be correctly fulfilled.

Thus, the system is able to enable a user to match and make automatic payments based on GPS location, whereas, the prior art only also allows for authorize secure payment through a server. Disclosed embodiments use GPS location to match to a business, start a customized application for that business (app may be based on a template), allow for shopping cart management for ordering from the customized app, allow a user to authorize the system server to make a secure payment to the matched business's server, and allow for a system server to transmit descriptive information about the vehicle to the business's server.

Thus, according to the present disclosure, a system is provided for in-vehicle ordering from, and secure payment to, a merchant in the immediate vicinity of the vehicle.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle, location-based, secure ordering and payment system provided within an automotive vehicle, the system comprising:
   an automotive vehicle in operative communication with a server, the automotive vehicle having:
      a processor in data communication with a graphical display device, an automotive vehicle occupant input device, a cellular data transceiver, a global positioning system (GPS) module, and a non-transitory data storage device on which is stored a unique vehicle identifier and computer readable code which, when executed on the processor, causes the automotive vehicle to:
         transmit to a server via the cellular data transceiver the automotive vehicle's geographic coordinates obtained from the GPS module;
         receive from the server via the cellular data transceiver an identifier of a merchant matched to the automotive vehicle's geographic coordinates;
         launch an app specific to the merchant that presents on the graphical display device a graphical user interface (GUI) that provides a list of at least one product or service offered for sale by the merchant and receives a user selection from the list as an order for purchase; and
         transmit the order and the vehicle identifier to the server via the cellular data transceiver; and
   the server having:
      a processor in data communication with a cellular data transceiver, a network interface, and a non-transitory data storage device on which is stored:
         a database containing:
            information of the merchant including geographic position coordinates of the merchant location and a network address of a server of the merchant;
            the vehicle identifier; and
            payment account information associated with the vehicle identifier; and computer code which, when executed on the processor, causes the server to:
receive the geographic coordinates of the automotive vehicle via the cellular data transceiver;
match the geographic coordinates of the automotive vehicle to the geographical coordinates of the merchant, and transmit to the automotive vehicle via the cellular data transceiver the identifier of the matched merchant;
receive the order and vehicle identifier;
charge the order to the payment account associated with the vehicle identifier; and
send the order, information of the payment, and information of the order recipient to the merchant server via the network interface,
wherein the order recipient information is stored on the server in association with the vehicle identifier, and includes at least one of a Bluetooth identifier, a license plate alphanumeric identifier, an RFID tag ID, an NFC based order ID and a description of the automotive vehicle including its make, model, and color.

2. The system of claim 1, wherein the order recipient information is received by the server in conjunction with the order, and includes one of a delivery address to which the merchant is to send the ordered item if the item is tangible, and an email address to which the merchant is to send the ordered item if the item is digital.

3. The system of claim 1, wherein the order recipient information includes a mobile phone number of an occupant of the automotive vehicle.

4. The system of claim 1, wherein the system is configured to store a history of orders placed on the system to facilitate repeat ordering of past orders.

5. An automotive vehicle configured for communication with a server and which together implement a system for location based ordering and payment, the automotive vehicle comprising:
a processor in data communication with:
a graphical display device,
a data input device for use by a vehicle occupant,
a cellular data transceiver,
a global positioning system (GPS) module, and
a non-transitory data storage device on which is stored a unique vehicle identifier and computer code which, when executed on the processor, causes the automotive vehicle to:
transmit to the server via the cellular data transceiver the automotive vehicle's geographic coordinates obtained from the GPS module;
receive from the server via the cellular data transceiver an identifier of a merchant matched to the automotive vehicle's geographic coordinates;
launch an app specific to the merchant that presents on the graphical display device a graphical user interface (GUI) that provides a list of at least one product or service offered for sale by the merchant and receives a user selection from the list as an order for purchase; and
transmit the order and the vehicle identifier and order recipient information to the server via the cellular data transceiver,
wherein the order recipient information is stored on the server in association with the vehicle identifier, and includes at least one of a Bluetooth identifier, a license plate alphanumeric identifier, an RFID tag ID, an NFC based order ID and a description of the automotive vehicle including its make, model, and color.

6. The automotive vehicle of claim 5, wherein the order recipient information is received by the server in conjunction with the order, and includes one of a delivery address to which the merchant is to send the ordered item if the item is tangible, and an email address to which the merchant is to send the ordered item if the item is digital.

7. The automotive vehicle of claim 5, wherein the order recipient information includes a mobile phone number of an occupant of the automotive vehicle.

8. The automotive vehicle of claim 5, wherein the system is configured to store a history of orders placed on the system to facilitate repeat ordering of past orders.

* * * * *